Aug. 16, 1960  P. J. ELLIS  2,949,036
DEVICES FOR PRODUCING LINEAR MOVEMENT
Filed Sept. 4, 1958  2 Sheets-Sheet 1

INVENTOR.
PETER JAMES ELLIS
BY
Frank R. Trifari
AGENT

Aug. 16, 1960     P. J. ELLIS     2,949,036

DEVICES FOR PRODUCING LINEAR MOVEMENT

Filed Sept. 4, 1958     2 Sheets-Sheet 2

INVENTOR.
PETER JAMES ELLIS

BY

*Frank R. Trifari*
AGENT

United States Patent Office  2,949,036
Patented Aug. 16, 1960

2,949,036

DEVICES FOR PRODUCING LINEAR MOVEMENT

Peter James Ellis, Three Bridges, Sussex, England, assignor to North American Philips Company, Inc., New York, N.Y.

Filed Sept. 4, 1958, Ser. No. 759,058

Claims priority, application Great Britain Sept. 6, 1957

3 Claims. (Cl. 74—89)

This invention relates to a device wherein linear movement between two parts of the device may be produced as a result of rotational movement applied between one of the two parts and a third part.

Such a device may be applied to, or form part of an apparatus where it is desired to move one portion of the apparatus, in a linear path, relative to another portion of the apparatus and where accurate control of this movement is necessary. In addition however, the apparatus may be such that while the two portions of the apparatus must be moved in either direction along a linear path, substantially no relative rotation of the two parts is permissible: for example, it may be required to move a rod along the circular bore of a tube or barrel without causing relative rotation of the rod and the tube: a further example is to be found in the tuning arrangements of a klystron.

In a klystron it is usually necessary to provide a mechanism which will permit a tuning slug to be moved in and out of a cavity extending through the wall of the klystron while at the same time maintaining the interior of the klystron under vacuum. Such devices therefore include some form of vacuum sealing means which is usually in the form of a bellows and the tuning slug is attached to the end of a rod or spindle which is movable in the direction of its axis and to the outer end of which one end of the bellows seal is hermetically sealed. In such a mechanism the required small movement of the tuning slug is conveniently effected by means of a screw thread arrangement located at the outer end of the spindle, the screw thread being of such fine pitch that small axial movement of the spindle and slug can be obtained by a suitable rotation of a screw thread member: the spindle is provided with means tending to prevent its rotation but these means have hitherto not proved very satisfactory. Further, it has been found difficult to so arrange the bellows vacuum seal as to permit adjustment to be effected by rotation of part of the device while avoiding undesirable strains on the bellows.

One object of the present invention therefore is to provide such a device wherein linear movement may be produced between two parts of the device and wherein relative rotation of the two parts is inhibited.

A further object of the invention is to provide such a device wherein a rod may be moved along a circular bore in a tube without causing relative rotation of the rod and the tube.

Other objects of the invention will be apparent from the description and claims.

According to the invention, in a device wherein relative linear movement between a first part thereof and a second part thereof is produced as the result of relative rotation between said first part and a third part of the device, the said first part comprises a cylindrical barrel, provided adjacent one end thereof with an internal screw thread, the said second part comprises a central spindle located coaxially within the barrel, two bearing surfaces formed on the said spindle and means secured to the spindle for inhibiting rotation of the spindle relative to the barrel, and the said third part comprises an annular lower bearing member located coaxially within the barrel, a screw thread on the outer surface of the said lower bearing member which thread is adapted to engage the thread formed on the inside of the barrel, an annular bearing surface formed on the inside of the lower bearing member, an upper bearing member also located inside the barrel and secured to the lower bearing member and an annular bearing surface formed on the upper bearing member, the two bearing surfaces on the centre bearing member and the two bearing surfaces formed respectively on the lower bearing member and the upper bearing member forming a channel and ball bearings disposed within said channel so that the arrangement of bearing members and balls forms a two-directional thrust bearing, the arrangement being such that rotation of the upper and lower bearing members within the barrel results in axial movement of the spindle relative to the barrel.

Preferably, the spindle is secured to the end of a rod coaxial with the spindle and the said rod is provided with one or more guide pins which project through longitudinal slots formed in the barrel so as to prevent rotational movement of the rod relative to the barrel.

Compressible spacing means may be provided between the upper bearing member and the lower bearing member so as to permit adjustment of the distance between the said two bearing members. Such compressible spacing means may, for instance, comprise a fibre washer or a spring washer.

One embodiment of the invention will now be described by way of example with reference to the accompanying diagrammatic drawings wherein.

As shown in the figures a klystron tuning mechanism comprises a tuner barrel 3 of hollow cylindrical form, the upper portion of the barrel having a wall of reduced thickness formed with an internal screw thread 31. The lower end of the barrel is formed with a portion 33 having a thicker wall than the remainder and in this portion are provided holes 34 by which the tuner barrel may be secured to the body of a klystron.

Figure 3:
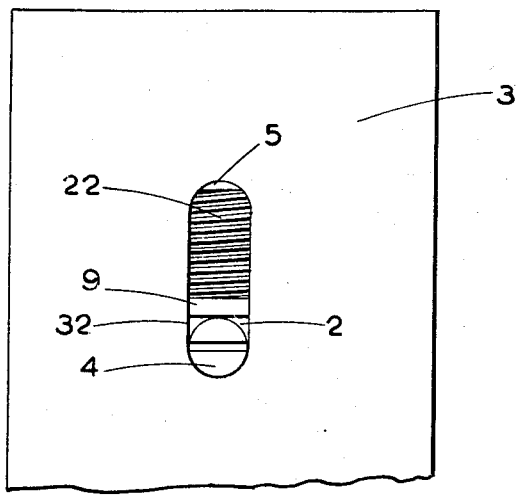
Figure 3 is a side view of the upper portion of the mechanism.

The upper portion of the barrel 3 is formed at the lower end of the screw threaded part with two diametrically-opposed slots 32 of a shape shown best in Figure 3. Within the upper portion of the tuner barrel is disposed a mechanism comprising an upper bearing 1 having a bearing surface 14 formed on the lower edge thereof a lower bearing 2 having a bearing surface 21 formed on an inner edge thereof and a centre spindle 6 having bearing surfaces 16 and 26 formed thereon. The bearing surfaces 14, 21, 16 and 26 engage ball bearings 8. The upper bearing 1 and lower bearing 2 are spaced from each other by a fibre bearing spacer 5 and the two bearings are secured together by means of three screws 13 which extend through clearance holes in a flange 11 of the bearing 1 and in the bearing spacer and are threaded into tapped holes 23 in the lower bearing. The upper bearing 1 is provided with a hexagonal socket 12 and the lower bearing 2 carries on its peripheral surface a screw thread 22 which engages with the thread 31 formed on the interior of the tuner barrel 3.

The stem portion 36 of the centre spindle 6 is provided with a screw thread which engages a tapped hole 27 formed in a tuner rod 7. The tuner rod 7 is provided with two tapped holes 17 into which are screwed guide pins 4, the head of each guide pin engaging in one of the slots 32 so as to inhibit rotary motion of the tuner rod 7. The tuner rod extends co-axially with the lower portion of the tuner barrel 3 and in use a tuning slug will be attached to the lower end of the tuner rod. To a shoulder at the upper end of the tuner rod 7 a bellows 19 is secured to a bush on the klystron, not shown. The tuner rod is provided with exhaust holes 15 through which air is removed from inside the bellows when the klystron is exhausted.

Figure 1:
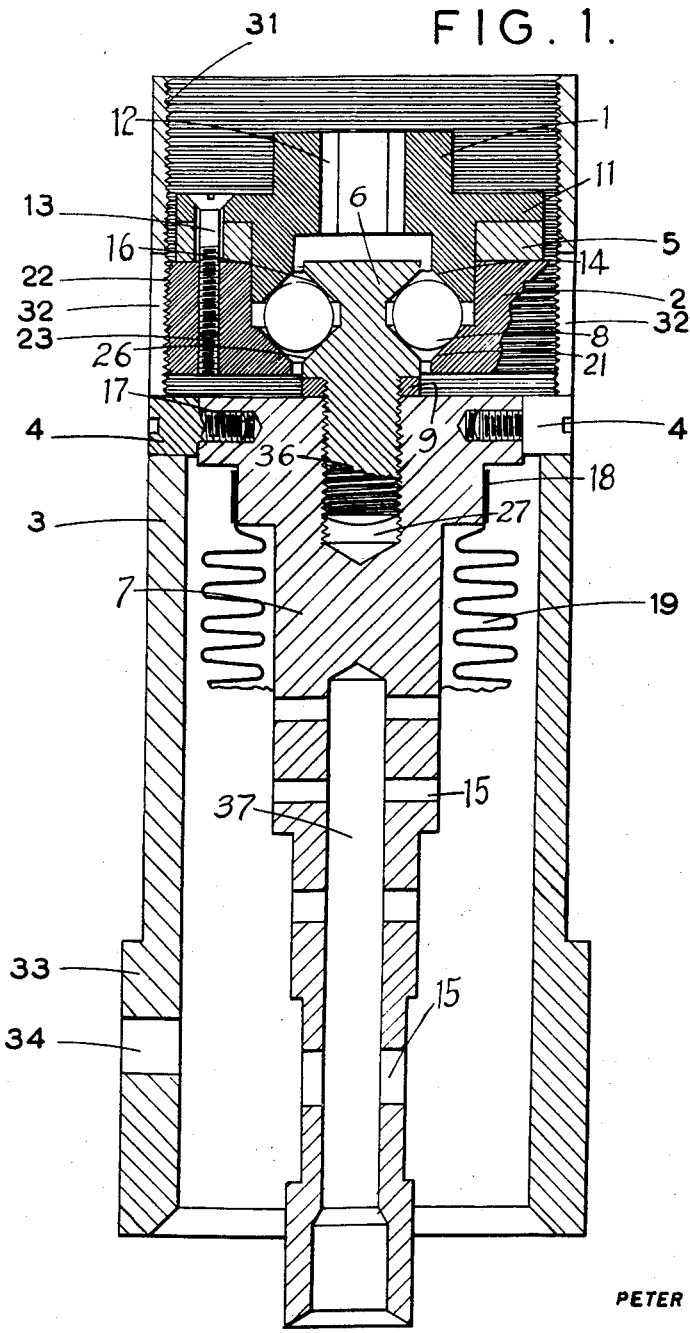
Figure 1 is a vertical section of a tuning mechanism for use with a klystron.
Figure 2:
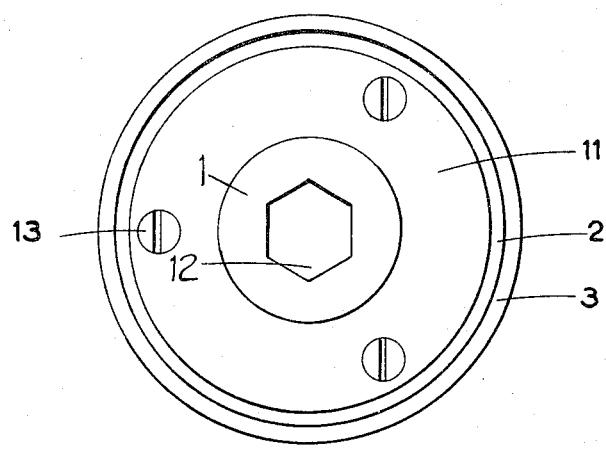
Figure 2 is a top plan view of the tuning mechanism.

It will be appreciated that the ball race at the upper end of the tuner mechanism provides a thrust bearing for the rod 7 and spindle 6 so that when the upper bearing 1 is rotated by means of a key inserted into the socket 12, the spindle 6 and rod 7 will be moved in a longitudinal direction, very little torque being transferred from the bearings 1 and 2 to the spindle 6; the pins 4 slide in the slots 32 and prevent rotation of the rod 7 and also act as limit stops so as to limit the travel of the rod 7 in an axial direction. In the position of the mechanism shown in Figures 1 and 3 the rod 7 is at its lower limit of travel. The spindle 6 is screwed tightly into the hole 27 so as to form a rigid connection with the rod 7, a fibre washer 9 being provided between the spindle and the rod.

Although in the embodiment described the upper bearing 1 and the lower bearing 2 are spaced by a fibre spacer, it may be convenient to substitute some other form of compressible spacing means, for instance, a spring washer or short, stiff coil spring for this spacer. It will be seen that adjustment of the screws 13 affords adjustment of the tightness of the whole thrust bearing so that the spacer between the bearings 1 and 2 requires generally to be stiff but to a certain extent compressible so as to allow for initial adjustment and also, for instance, adjustment for wear of the bearing.

The rotation of the bearings 1 and 2 may be controlled at a distance by means of a flexible shaft having at the end a key adapted to fit into the upper bearing 1; although a hexagonal socket 12 is shown in the figure any other suitable means may be employed when rotating the bearing 1. An indicating means of any known suitable type may be fitted to the bearing 1 or to a control member acting on this bearing and such indication may be provided either adjacent the tuning mechanism or itself or where remote control means are used, at the remote position: such indicating means may, for instance, comprise an indicator of the type commonly employed in micrometers.

It is to be understood that the above description is illustrative only and that, if desired, changes and modifications may be made without departing from the spirit and scope of the invention as defined in the appended claims.

What I claim is:

1. A device wherein relative linear movement between a first part thereof and a second part thereof is produced as the result of relative rotation between said first part and a third part of the device, the said first part comprising a cylindrical barrel provided adjacent one end thereof with an internal screw thread, the said second part comprising a central spindle located coaxially within the barrel, two bearing surfaces formed on the said spindle and means secured to the spindle for inhibiting rotation of the spindle relative to the barrel, said third part comprising an annular lower bearing member located coaxially within the barrel, a screw thread on the outer surface of the said lower bearing member which thread is adapted to engage the thread formed on the inside of the barrel, an annular bearing surface formed on the inside of the lower bearing member, an upper bearing member also located inside the barrel and secured to the lower bearing member and an annular bearing surface formed on the upper bearing member, the two bearing surfaces on the centre bearing member and the two bearing surfaces formed respectively on the lower bearing member and the upper bearing member forming a channel and ball bearings disposed within said channel so that the arrangement of bearing members and balls forms a two-directional thrust bearing, the arrangement being such that rotation of the upper and lower bearing members within the barrel results in axial movement of the spindle relative to the barrel.

2. A device as claimed in claim 1 wherein the spindle is secured to the end of a rod coaxial with the spindle and wherein the said rod is provided with one or more guide pins which project through longitudinal slots formed in the barrel so as to prevent rotational movement of the rod relative to the barrel.

3. A device as claimed in claim 2 wherein compressible spacing means are provided between the upper bearing member and the lower bearing member so as to permit adjustment of the distance between the said two bearing members.

References Cited in the file of this patent

UNITED STATES PATENTS

| | | |
|---|---|---|
| 1,053,715 | Cromwell | Feb. 18, 1913 |
| 2,136,731 | Benner | Nov. 15, 1938 |
| 2,226,727 | Kroes | Dec. 31, 1940 |
| 2,396,802 | Mauromtseff et al. | Mar. 19, 1946 |
| 2,444,703 | Jones | July 6, 1948 |
| 2,880,620 | Bredtschneider | Apr. 7, 1959 |